United States Patent [19]
Yanes et al.

[11] Patent Number: 6,038,620
[45] Date of Patent: Mar. 14, 2000

[54] METHOD AND SYSTEM FOR OPTIMAL HIGH SPEED MATCH IN A HIGH PERFORMANCE CONTROLLER WHICH ENSURES AN INPUT/OUTPUT INTERFACE STAYS AHEAD OF A HOST INTERFACE

[75] Inventors: Adalberto G. Yanes, Sunnyvale; David C. Giese, Pleasanton, both of Calif.

[73] Assignee: International Business Machines Corporation, Armonk, N.Y.

[21] Appl. No.: 08/709,931

[22] Filed: Sep. 9, 1996

[51] Int. Cl.[7] ................................................. G06F 13/14
[52] U.S. Cl. ............................... 710/52; 710/60; 710/29; 710/129
[58] Field of Search ..................... 395/878, 879, 395/880, 877, 872, 306, 309, 849; 710/57–60, 52, 126, 129, 29

[56] References Cited

U.S. PATENT DOCUMENTS

| | | | |
|---|---|---|---|
| 4,258,418 | 3/1981 | Heath | 395/873 |
| 4,378,588 | 3/1983 | Katzman et al. | 395/877 |
| 4,839,791 | 6/1989 | Ito | 395/876 |
| 4,860,193 | 8/1989 | Bentley et al. | 395/875 |
| 4,956,808 | 9/1990 | Aakre et al. | 395/888 |
| 5,014,237 | 5/1991 | Masters et al. | 395/500 |
| 5,179,662 | 1/1993 | Corrigan et al. | 711/2 |
| 5,210,829 | 5/1993 | Bitner | 395/877 |
| 5,241,630 | 8/1993 | Lattin, Jr. et al. | 395/308 |
| 5,249,271 | 9/1993 | Hpkinson et al. | 395/877 |
| 5,361,335 | 11/1994 | Oyadomari | 395/877 |
| 5,379,162 | 1/1995 | Cunningham et al. | 360/53 |
| 5,398,158 | 3/1995 | Fisher et al. | 361/685 |
| 5,412,519 | 5/1995 | Buettner et al. | 360/73.03 |
| 5,412,780 | 5/1995 | Rushton | 711/113 |
| 5,434,872 | 7/1995 | Petersen t al. | 371/57.1 |
| 5,440,691 | 8/1995 | Carrafiello et al. | 395/200.64 |
| 5,450,546 | 9/1995 | Krakirian | 395/877 |
| 5,513,326 | 4/1996 | Nute | 395/880 |
| 5,522,050 | 5/1996 | Amini et al. | 395/306 |
| 5,524,268 | 6/1996 | Geldman et al. | 395/825 |
| 5,537,555 | 7/1996 | Landry et al. | 395/306 |
| 5,537,622 | 7/1996 | Baum et al. | 707/1 |
| 5,550,991 | 8/1996 | Keener et al. | 395/309 |
| 5,623,606 | 4/1997 | Yokoyama et al. | 395/200.62 |
| 5,623,607 | 4/1997 | Kodama et al. | 395/849 |
| 5,630,067 | 5/1997 | Kindell et al. | 395/200.61 |
| 5,652,916 | 7/1997 | Murakami et al. | 395/872 |
| 5,659,799 | 8/1997 | Wu et al. | 395/877 |
| 5,671,445 | 9/1997 | Gluyas et al. | 395/873 |
| 5,682,554 | 10/1997 | Harrell | 395/877 |
| 5,687,316 | 11/1997 | Graziano et al. | 395/200.8 |
| 5,721,839 | 2/1998 | Callison et al. | 395/308 |
| 5,732,094 | 3/1998 | Petersen et al. | 371/51.1 |

*Primary Examiner*—Ayaz R. Sheikh
*Assistant Examiner*—Sumati Lefkowitz
*Attorney, Agent, or Firm*—Sawyer & Associates; Esther E. Klein

[57] ABSTRACT

A method and system in accordance with the present invention provides a mechanism that would dynamically change the backing factor. The backing factor is the amount of time needed to ensure that the I/O interface can stay ahead of the host interface. A method and system for providing a high performance control unit to provide for optimal matching of first and second interfaces comprises calculating a backing factor based upon minimal memory contention, optimal data rate and minimal rotational delay, and determining whether a particular result has been achieved. The method and system further includes calculating a new backing factor based upon current and projected data rates if the desired result has not been achieved. In a preferred embodiment, the initial backing factor is calculated assuming no memory contention, the best possible data rate for both the I/O and host interface and no rotational delay. This backing factor time is a smaller time unit than the static backing factor time of the conventional system, which was based on an average data rate.

22 Claims, 6 Drawing Sheets

METHOD AND SYSTEM FOR OPTIMAL HIGH SPEED MATCH IN A HIGH PERFORMANCE CONTROLLER WHICH ENSURES AN INPUT/OUTPUT INTERFACE STAYS AHEAD OF A HOST INTERFACE

TECHNICAL FIELD

The present invention relates to a high performance control unit in a processing system and more particularly to maintaining speeds of a host and I/O interface in a data processing system.

BACKGROUND

High performance control units are utilized to maintain speeds of host and I/O interfaces in a data processing system. Typically these interfaces are bridges between different types of technologies and both access a shared memory. An example of a host interface may, for example, be a proprietary bus such as a Proposed Draft Addendum (PDAD) bus. An example of a I/O interface is a Small Computer Systems Interface (SCSI) bus. Typically, a host interface can access data faster than the I/O interface. Consequently, typically there are more I/O interfaces than host interfaces.

In a high performance control unit the host interface needs to access the data from the I/O interface as soon as possible. One potential problem that arises when starting the host interface too soon is that the host interface may pass the I/O interface causing an underrun. On the conservative side, a store and forward mode can be enabled where all the data is read from the drive before starting the host interface. This ensures that there are no underruns but it does not provide the best performance system. One would like to be aggressive such that the I/O interface stays just ahead of the host interface but also minimize underruns which causes system retries also affecting performance. The amount of time needed to ensure that the I/O interface can stay ahead of the host interface is referred to as the "backing factor." The determination of the backing factor is based on the data rate of the disk, I/O interface data rate to the disk, host interface's data rate, discontinuities in the data stream due to the drive (head switch and motion seek).

Static backing factor arrangements for use with high performance control units are known. In a system with a static backing factor arrangement the calculation of the backing factor is done before the I/O interface starts accessing the data from the drive. The system will set a timer with the backing factor value which will cause an interrupt indicating that it is time to start the host interface. The data from the I/O interface is being stored in the control unit's memory. Both the I/O interface and the host interface will be accessing the memory at the same time. In this type of system, the I/O interface will have a head start based on the backing factor. In a typical static backing arrangement, the value calculated for the backing factor is based on an average data rate with a nominally loaded memory system.

The problems encountered with the static backing factor are related to three issues.

1. The I/O interface and the host interface are competing with other processes for the main memory. Each process has to arbitrate for the memory bus internal to its chip. Then it has to arbitrate among the different chips for access to the memory. This affects the data rate of the I/O interface in accessing the memory potentially aggravating the amount of underruns in heavily loaded systems. In lightly loaded systems the I/O interface will run at a faster data rate so we will not have any underruns but our performance will not be as fast as it could have been.

2. In most control units the host interface has a higher data rate thus it will naturally catch up to the I/O interface.

3. Another issue that causes underruns is unique to disks. The disk may have unexpected revolutions after the start of data transfer. This will definitely cause an underrun as the backing factor assumes no unexpected revolutions to optimize for performance.

Accordingly, what is needed is a method and system that overcomes the abovementioned problems. The present invention addresses such a need.

SUMMARY

A method and system in accordance with the present invention provides a mechanism that would dynamically change the backing factor. A method and system for providing a high performance control unit to provide for optimal matching of first and second interfaces comprises calculating a backing factor based upon minimal memory contention, optimal data rate and minimal rotational delay, and determining whether a particular result has been achieved. The method and system further includes calculating a new backing factor based upon current and projected data rates if the desired result has not been achieved. In a preferred embodiment, the initial backing factor is calculated assuming no memory contention, the best possible data rate for both the I/O and host interface and no rotational delay. This backing factor time is a smaller time unit than the static backing factor time of the conventional system, which was based on an average data rate.

DETAILED DESCRIPTION

The present invention relates to an improvement in a high performance control unit in a data processing system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
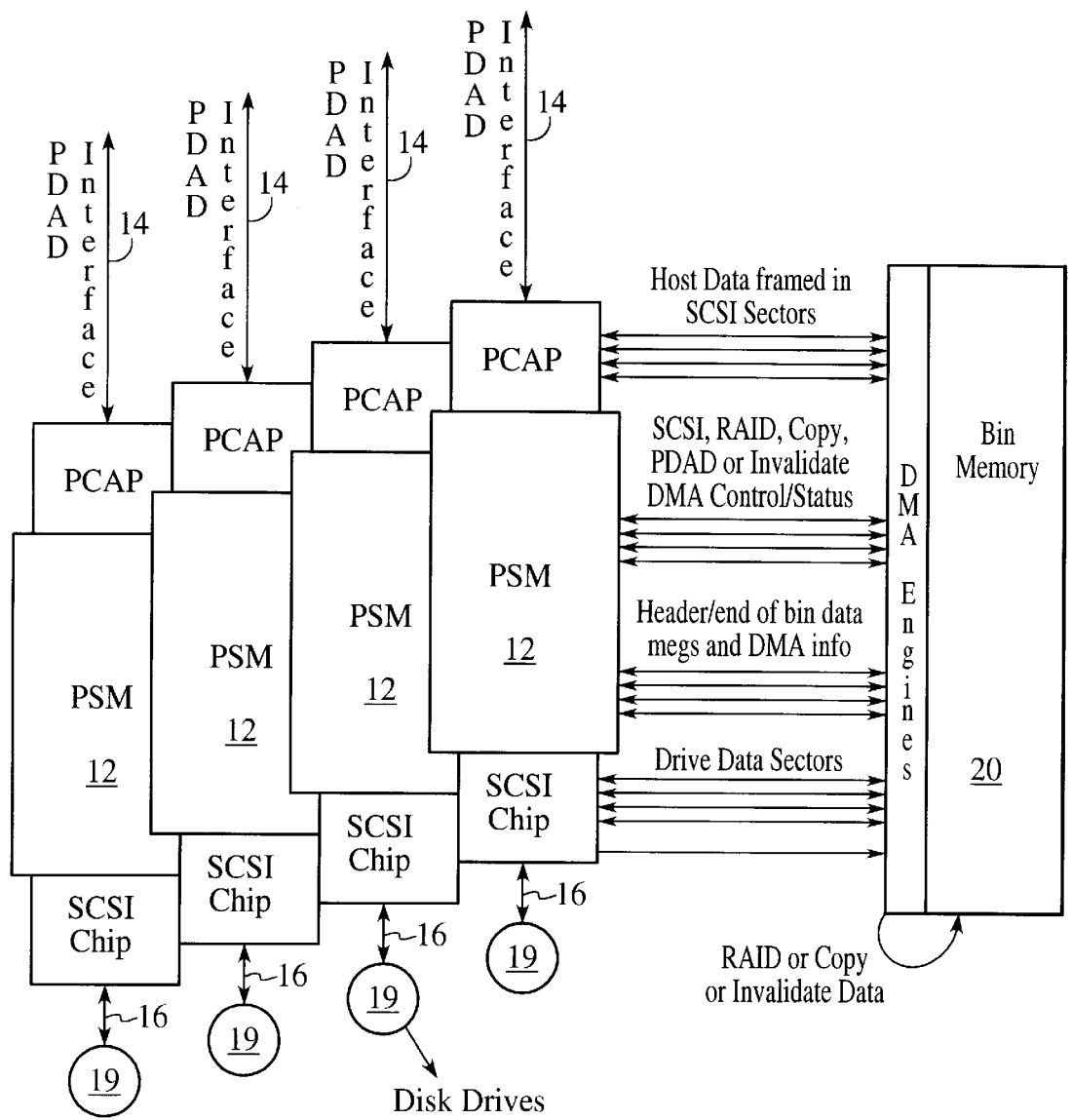
FIG. 1 is a block diagram of a typical high performance control system.

FIG. 1 is a block diagram of a performance control system 10. The system includes a plurality of adapters 12 which are coupled between a plurality of I/O interfaces 14, in this case an SCSI interface, and a plurality of host interfaces 16, in this case a PDAD interface. Both the host and I/O interfaces access memory 20. There has been a need to develop systems for allowing for the host and I/O interfaces 14 and 16 to interact more efficiently. As is seen the I/O interfaces 16 interact with the disk drives 19. As is shown, these host and I/O interfaces 14 and 16 will also interact with main memory °through the adapters 12 identified as microprocessors to allow for increased access of data. As has also been before mentioned, the I/O interfaces 16 in this embodiment are slower than the host interfaces 14 and there are typically more of them. In a typical example, there are 64 I/O interfaces 16 as compared to four host interfaces 14. Accordingly, what is needed is a system for insuring that this system operates more efficiently.

Figure 2:
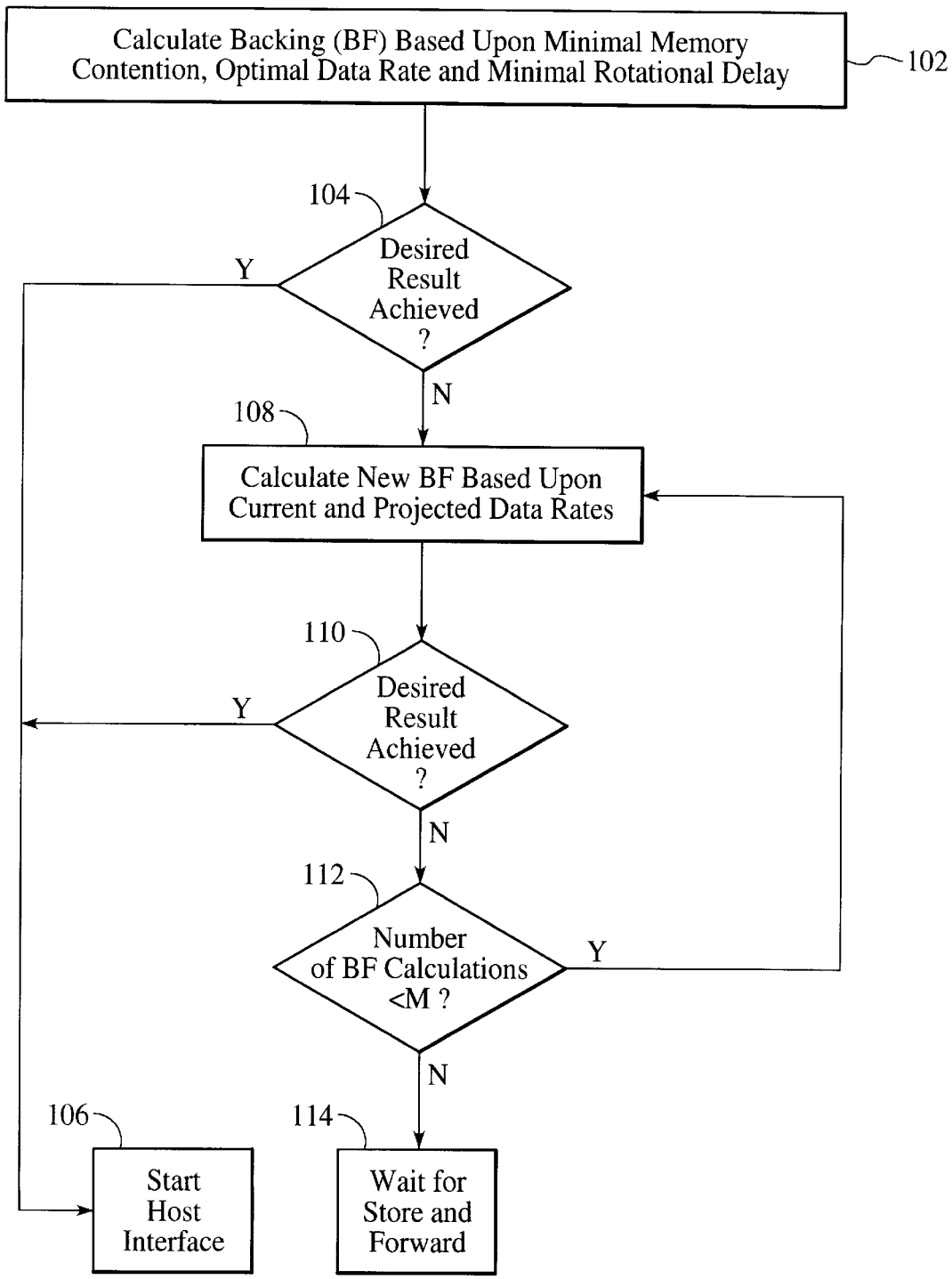
FIG. 2 is a flow chart showing the dynamic backing factor scheme in accordance with the present invention.

This is accomplished through an improved dynamic backing factor arrangement to allow for the high speed match of the host and I/O interfaces through the use advantageously of software for providing that matching. To more specifically describe the present invention, refer now to FIG. 2, which is a simple flow chart of the operation of a dynamic factor method for providing a high speed match in accordance with the present invention.

As is seen, first a backing factor is calculated based on a minimal memory contention, optimal data rate and a minimal rotational delay, via step 102. Next it is determined if the backing factor has provided the desired result, that is, does the calculated backing factor permit access of the required data by the I/O interface, via step 104. If the backing factor has achieved the desired result, then the host interface can be started, via step 106. However, if the backing factor has not achieved the desired result, then a new backing factor must be calculated, via step 108. The new backing factor will be based upon the current and projected data rates. The projected data rate can be based upon a variety of factors. Then it must be determined whether the new backing factor has achieved the desired result, via step 110. If it did, then the host interface is started, via step 106. If it has not, then it must be determined if the number of times the backing factor has been calculated equal some predetermined number, in this case, m, via step 112. This is done because, as will be mentioned later, the number of times that the backing factor has to be calculated can impede the overall efficiency of the performance unit. So typically there must be some limit on the number of backing factor calculations. If the number of calculations are less than the predetermined number, then a new backing factor will be calculated, via step 108. If, on the other hand, the number of calculations is greater than m, then wait for the I/O interface to enter the store and forward mode, via step 114. By providing for a dynamic backing factor scheme, the overall performance of the system can be considerably improved.

Figure 3A:
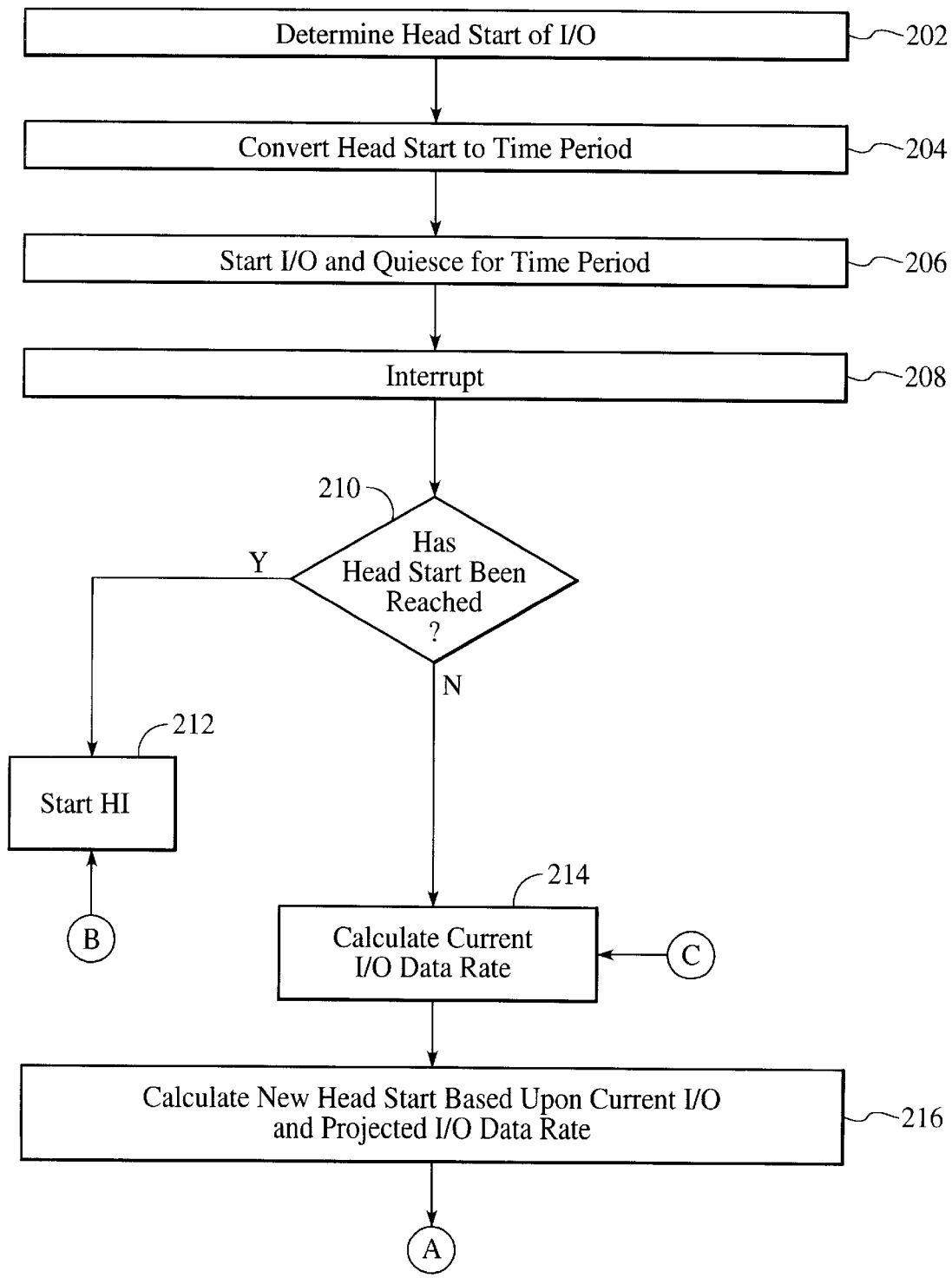
FIGS. 3A and 3B are detailed block diagrams of one embodiment of a dynamic backing factor process in accordance with the present invention.
Figure 3B:
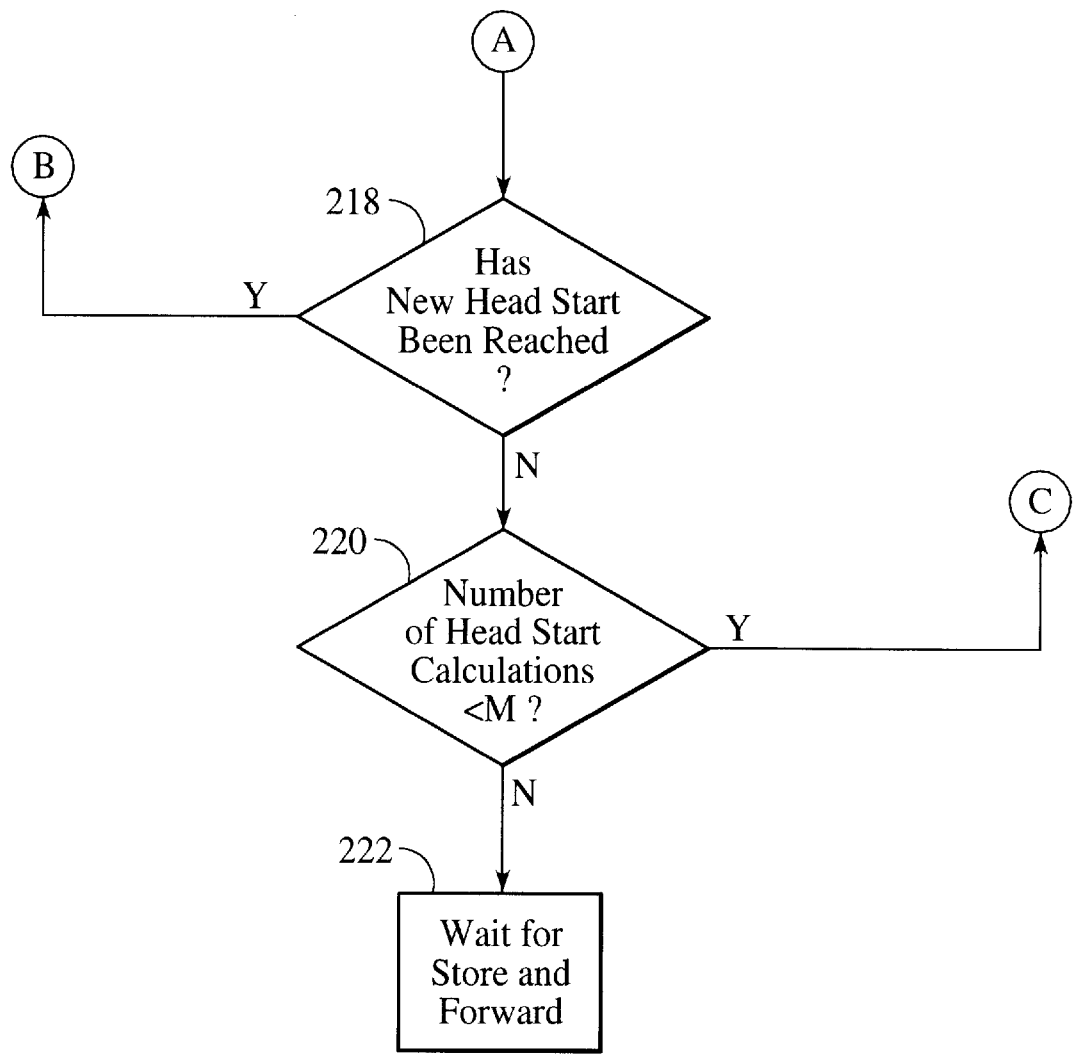

To provide a more detailed example of the present invention, refer now to FIGS. 3A and 3B, which are detailed flow charts of a method for providing a high speed number of host and I/O interfaces. In this embodiment, initially a head start is determined, the head start being the equivalent of the first backing factor, via step 202.

Figure 4:
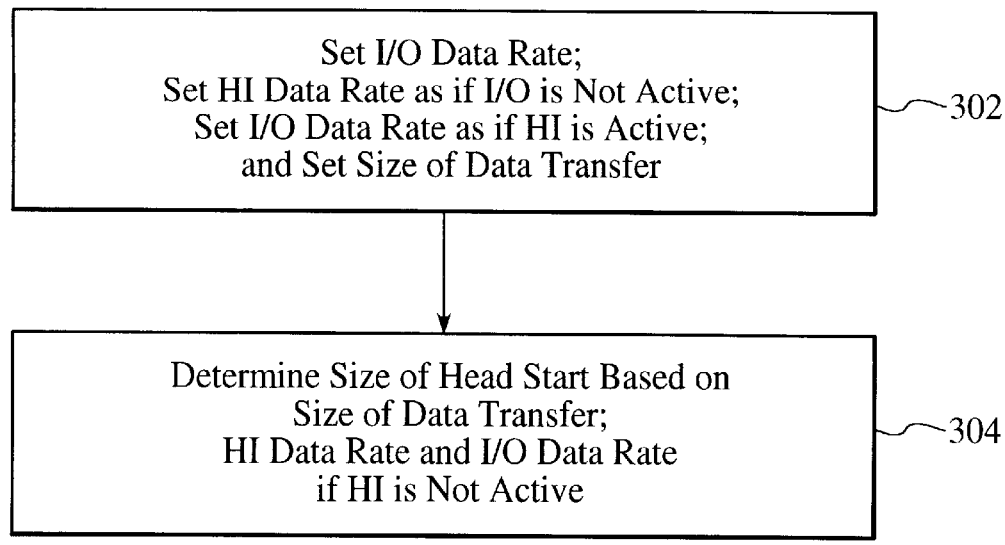
FIG. 4 is a flow chart of the calculation of a first head start in accordance with the present invention.

Referring now to FIG. 4, what is shown is a chart showing the initial backing factor or head start determination. As is seen, the host data rate is set, the I/O interface data rate is set as if the host is not active, the I/O interface data rate is set as if the host is active, and the size of the data transfer is set, via step 302. Thereafter the size of the head start is determined based on the size of the data transfer, the host interface data and the I/O interface data rate as if the host interface is not active. Referring back to FIGS. 3A and 3B, the head start is converted into a time period, via step 204 and the I/O interface can be started and the task is quiesced for the time period, via step 206. Steps 204 and 206 can be started in parallel. An interrupt is then provided, via step 208, and then it must be determined whether the head start has been reached, via step 210. If the head start has been reached, then the host interface is started, via step 212. If the head start has not been reached, then you calculate the current I/O interface data rate, via step 214. After the current I/O interface data rate is calculated via step 214, then a new head start or backing factor is calculated based on the current I/O interface data rate and a projected I/O interface data rate, via step 216.

Figure 5:
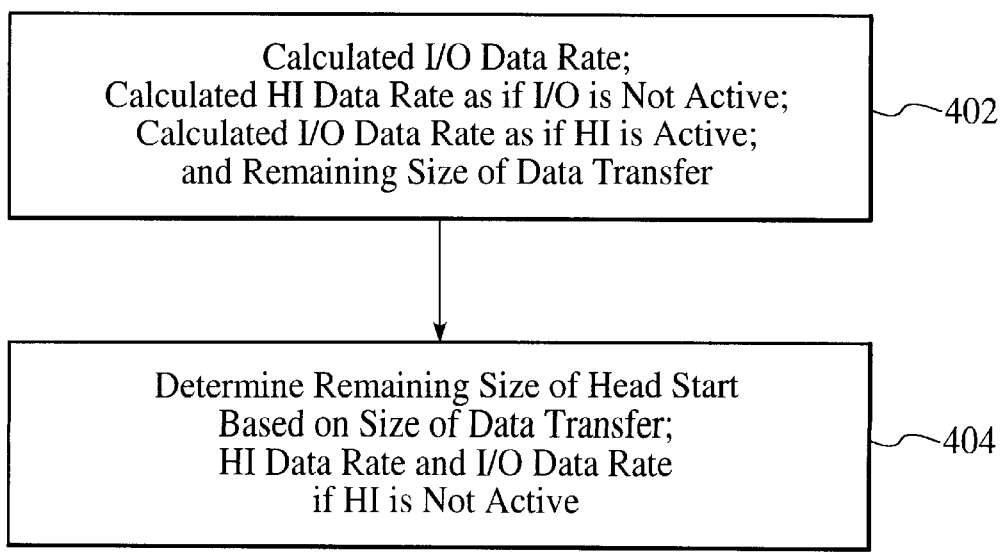
FIG. 5 is a flow chart of the calculation of a subsequent head start in accordance with the present invention.

Referring now to FIG. 5, what is shown is a chart showing the backing factor or head start determination. As is seen, the calculated host interface data rate, the calculated I/O interface data rate as if the host interface is not active, the calculated I/O interface data rate as if the host interface is active, and the calculated size of the remaining size of the data transfer are provided, via step 402. Thereafter the size of the head start is determined based on the remaining size of the data transfer, the host interface data and the I/O interface data rate as if the host interface is not active, via step 404.

Referring back to FIGS. 3A and 3B, a determination is made as to whether the new head start has been reached via step 218. If it has been reached then start host interface via step 212. If it has not been reached, then it is determined if the number of head start calculations is less than a predetermined number, via step 220. If the number of calculations is more than the predetermined number then the system will wait for store and forward mode. If it is less than the predetermined number then the current I/O interface data rate will be calculated via step 214 and steps 216–218 will be repeated.

Figure 6:
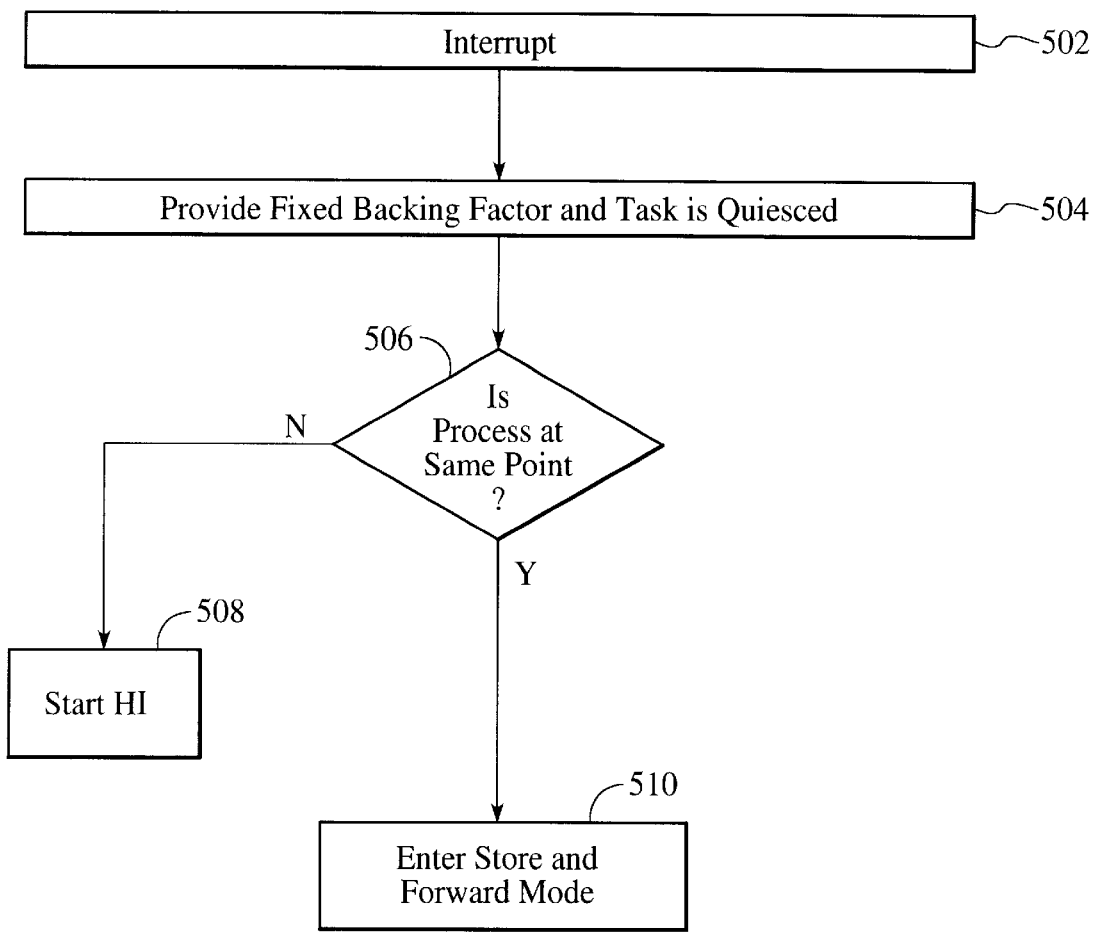
FIG. 6 is a flow chart of an alternate embodiment after a second backing factor is calculated.

In an alternative embodiment, after the second backing factor is calculated, then a fixed backing factor time could be utilized. To more particularly illustrate this feature, refer now to FIG. 6. If, for example, the new head start has not been reached after the second backing factor has been calculated, an interrupt occurs, via step 502. Thereafter a fixed backing factor is provided and the task is quiesced, via step 504. Then it is determined if the process is at the same point, via step 506. If it is not at the same point, then the host interface will be started, via step 508. If the process is at the same point, the hardware will enter store and forward mode, allowing the I/O interface to receive all the data, via step 510.

To apply the present invention to a more specific example, refer now to the following:

Firstly, the respective data rates and the size of the data transfer is determined.

Host interface data rate=10 Mb/Sec

I/O interface data rate=10 Mb/Sec with no memory contention

I/O interface data rate=5 Mb/Sec when both the host and the I/O are accessing the memory The size of the transfer is 20K bytes of data Next, it is determined how much of head start does the I/O interface need in terms of bytes to finish before the host interface?

Y bytes of data is the size of the head start so (20-Y) bytes/5 Mb/Sec less than (20 k/20 Mb/Sec)

This results in 10K bytes of data head start. The Y bytes of data is converted into time based on the data rate of the I/O interface into memory when the host interface is not active which in our specific application is 10 Mb/Sec which gives us a time of 1 millisecond.

Since multiple threads are occurring in the system an interrupt driven process is used as opposed to a polling method. When the timer reaches its value it will cause an interrupt to the process which activates the host interface. In the dynamic backing factor scheme in accordance with the present invention when the interrupt occurs the process checks the current address of the I/O interface engine. The backing factor time was determined to be the amount of time X to achieve Y bytes of data based on data rate Z. The process will determine if Y bytes of data was achieved.

If Y bytes of data was reached then that indicates that the system currently has low activity among the different adapters allowing the I/O interface to achieve its maximum data rate into the memory and that a rotational delay has not occurred. Thus the host interface is invoked to start accessing the memory.

If Y bytes was not achieved but rather only A bytes of data then we calculate the data rate sustained during the time of the original backing factor. The current I/O interface data rate achieved in accessing the main memory would be A bytes/X time where A bytes is less than the expected Y bytes of data.

Based on the current data rate a new backing factor is calculated where the remaining bytes of data (Y-A) is calculated at the current data rate and rest of the operation is calculated on the projected data rate after the host interface is started.

The projected data rate is based on a scheme that indicates that the difference between the current and the projected is minimized as the memory system has increased number of DMA engines.

For example, if the memory bus bandwidth is 20 Mb/Sec and the current data rate is 4 Mb/Sec this indicates that the I/O interface is receiving ⅕th of the bandwidth. This translates to the fact that 1 of 5 DMA engines are accessing the memory. After the host interface starts the I/O interface will be 1 of 6 DMA engines thus the projected data rate would be 3.33 Mb.

An approximation that gives reasonable results is to take the current data rate and subtract that from the data rate that could have been achieved if no memory contention would have occurred. The result is divided by two (a shift command) and that is subtracted from the projected data rate if only the host and I/O interface was accessing the memory. Based on these two new data rates a new backing factor time is computed and that value is used to determine the time to interrupt the process again.

After the second interrupt caused by the backing factor occurs the process will read the address and if the address is not equal to the previous value read then the host interface will be started.

If the values are equal then most likely a revolution is currently occurring on the disk. At this point the process will create a fixed 2 ms backing factor time and quiesce.

After the 2 ms time is done and the interrupt occurs the process will check the address. If the values are still the same, it will then go to a store and forward mode by setting up the hardware to interrupt the process when all the data is received. The process will then quiesce waiting for the interrupt. If the values are different then the host interface will begin.

In this embodiment, the 2 ms number is 25 percent of the average disk revolution of 8 ms. It is also known that a single track seek is less than 2 ms which we wanted to ensure would not cause us to go into a store and forward mode. A head switch of a disk drive occurs in a higher frequency than a revolution but a head switch is only 0.8 ms so that is covered in our 2 ms value.

Interrupts cause code overhead, so the present application just causing one additional interrupt was determined to be the most effective. It should be understood, however, the interrupts can be any number and their use would be within the spirit and scope of the present invention.

Although the system and method has been described in accordance with the embodiments shown, one of ordinary skill in the art will readily recognize that there could be variations to the embodiments and those variations would be within the spirit and scope of the above described system and method. For example, although the I/O interfaces are slower than the host interfaces, the data rates could be reversed and their use would be within the spirit and scope of the present invention. Accordingly, many modifications may be made by one of ordinary skill in the art without departing from the spirit and scope of the appended claims.

We claim:

1. A method for allowing a high performance control unit provide for optimal matching of first and second interfaces comprising the steps of:

(a) calculating a backing factor based upon minimal memory contention, optimal data rate and minimal rotational delay;

(b) loading a dynamic amount of data into a main memory;

(c) determining whether the backing factor factor permits access of the data by the first interface; and (d) calculating a new backing factor based upon current and projected data rates if the backing factor does not permit access of the data by the first interface.

2. The method of claim 1 in which the first interface comprises an I/O interface.

3. The method of claim 2 in which the I/O interface comprises a Small Computer Systems Interface (SCSI) bus.

4. The method of claim 1 in which the second interface comprises a host interface.

5. The method of claim 4 in which the host interface comprises a Proposed Draft Addendum (PDAD) bus.

6. A method for providing an optimal high speed match between host and I/O interfaces when performing a task in a high performance controller comprising the steps of (a) determining a head start of an I/O interface;

(b) converting the head start into a time period;

(c) starting the I/O interface to access a dynamic amount of data in a main memory and the task quiesces for the time period;

(d) providing an interrupt;

(e) determining whether a head start has been reached; if the head start has been reached, then starting the host interface; if the head start has not been reached, (f) calculating a current I/O interface data rate; and (g) calculating a new head start based upon the current I/O interface data rate and a projected I/O interface data rate.

7. The method of claim 6 further comprises (h) determining if the new head start has been reached, if it has been reached then starting the host interface; if the new head start has not been reached, (i) determining if a number of new head start calculations is less than some predetermined number; if it is less then return to step (e); if it is greater or equal to the predetermined number, then wait for store and forward mode.

8. The method of claim 6 further comprises
(h) providing a second interrupt;
(i) providing backing factor and the task quiesces for a predetermined time period; and
(j) determining if the task accessed a same memory address after both the interrupt and the second interrupt; if the memory address is not the same, start host interface; if the memory address is the same, then enter store and forward mode.

9. The method as in claim 6 in which the head start determining step (a) comprises setting the host interface data rate, setting the I/O interface data rate as if the host interface is not active, setting the I/O interface data rate as if the host interface is active, and setting the size of the data transfer; and determining the size of the head start based on the size of the data transfer, host interface data rate and I/O interface data rate if host interface is not active.

10. A system for allowing a high performance control unit provide for optimal matching of first and second interfaces comprising the steps of
means for calculating a backing factor based upon minimal memory contention, optimal data rate and minimal rotational delay;
means for loading a dynamic amount of data into a main memory;
means responsive to the backing factor calculating means for determining whether the backing factor permits access of the data by the first interface; and
means responsive to the determining means for calculating a new backing factor based upon current and projected data rates if the backing factor does not permit access of the data by the first interface.

11. The system of claim 10 in which the first interface comprises an I/O interface.

12. The system of claim 11 in which the I/O interface comprises a Small Computer Systems Interface (SCSI) bus.

13. The system of claim 10 in which the second interface comprises a host interface.

14. The system of claim 13 in which the host interface comprises a Proposed Draft Addendum (PDAD) bus.

15. A system for providing an optimal high speed match between host and I/O interfaces when performing a task in a high performance controller comprising the steps of
means for determining a head start of an I/O interface;
means for converting the head start into a time period;
means for starting the I/O interface to access a dynamic amount of data in a main memory and the task quiesces for the time period;
means responsive to the converting means for providing an interrupt;
means responsive to the providing means for determining whether a head start has been reached; if the head start has been reached, then starting the host interface; if the head start has not been reached, calculating a current I/O interface data rate; and
means responsive to the determining means for calculating a new backing factor based upon the current I/O interface data rate and a projected I/O interface data rate.

16. The system of claim 15 further comprises
means for determining if the new head start has been reached, if it has been reached then starting the host interface;
means responsive to determining that the new head start has not been reached for determining if a number of head start calculations is less than some predetermined number; and means responsive to predetermined number determining means for waiting for store and forward mode.

17. The system of claim 15 further comprises:
means for providing a second interrupt;
means for providing backing factor and the task quiesces for a predetermined time period responsive to the interrupt; and
means for determining if the task is at a same point; if the task is not at the same point start host interface; if the task is at the same point, then enter store and forward mode.

18. The system of claim 15 in which the head start determining means comprises setting the host interface data rate, setting the I/O interface data rate as if the host interface is not active, setting the I/O interface data rate as if the host interface is active, and setting the size of the data transfer, host interface data rate and I/O interface data rate if host interface is not active.

19. A computer readable medium for containing program instructions allowing a high performance control unit provide for optimal matching of first and second interfaces, the program instructions for:
(a) calculating a backing factor based upon minimal memory contention, optimal data rate and minimal rotational delay;
(b) loading a dynamic amount of data into a main memory;
(c) determining whether the backing factor factor permits access of the data by the first interface; and
(d) calculating a new backing factor based upon current and projected data rates if the backing factor does not permit access of the data by the first interface.

20. A method for providing an optimal high speed match between host and I/O interfaces when performing a task in a high performance controller comprising the steps of
(a) determining a head start of an I/O interface;
(b) converting the head start into a time period;
(c) starting the I/O interface to access a dynamic amount of data in a main memory and the task quiesces for the time period;
(d) providing an interrupt;
(e) determining whether a head start has been reached; if the head start has been reached, then starting the host interface; if the head start has not been reached,
(f) calculating a current I/O interface data rate; and
(g) calculating a new head start based upon the current I/O interface data rate and a projected I/O interface data rate.

21. A method for providing an optimal high speed match between host and I/O interfaces when performing a task in a high performance controller comprising the steps of
(a) determining a head start of an I/O interface;
(b) converting the head start into a time period;
(c) starting the I/O interface to access a dynamic amount of data in a main memory and the task quiesces for the time period;
(d) providing an interrupt;
(e) determining whether a head start has been reached; if the head start has been reached, then starting the host interface; if the head start has not been reached,
(f) calculating a current I/O interface data rate;
(g) calculating a new head start based upon the current I/O interface data rate and a projected I/O interface data rate;

(h) determining if the new head start has been reached, if it has been reached then starting the host interface; if the new head start has not been reached, (i) determining if a number of new head start calculations is less than some predetermined number; if it is less then return to step (e); if it is greater or equal to the predetermined number, then wait for store and forward mode.

22. A system for providing an optimal high speed match between host and I/O interfaces when performing a task in a high performance controller comprising the steps of means for determining a head start of an I/O interface;

means for converting the head start into a time period; means for starting the I/O interface to access a dynamic amount of data in a main memory and the task quiesces for the time period;

means responsive to the converting means for providing an interrupt;

means response to the providing means for determining whether a head start has been reached; if the head start has been reached, then starting the host interface; if the head start has not been reached, calculating a current I/O interface data rate;

means responsive to the determining means for calculating a new backing factor based upon the current I/O interface data rate and a projected I/O interface data rate;

means responsive to determining that the new head start has not been reached for determining if a number of head start calculations is less than some predetermined number; and means responsive to predetermined number determining means for waiting for store and forward mode.

* * * * *